No. 737,171. PATENTED AUG. 25, 1903.
S. SZENTJÁNOSSY.
COOKING UTENSIL.
APPLICATION FILED NOV. 24, 1902.
NO MODEL.
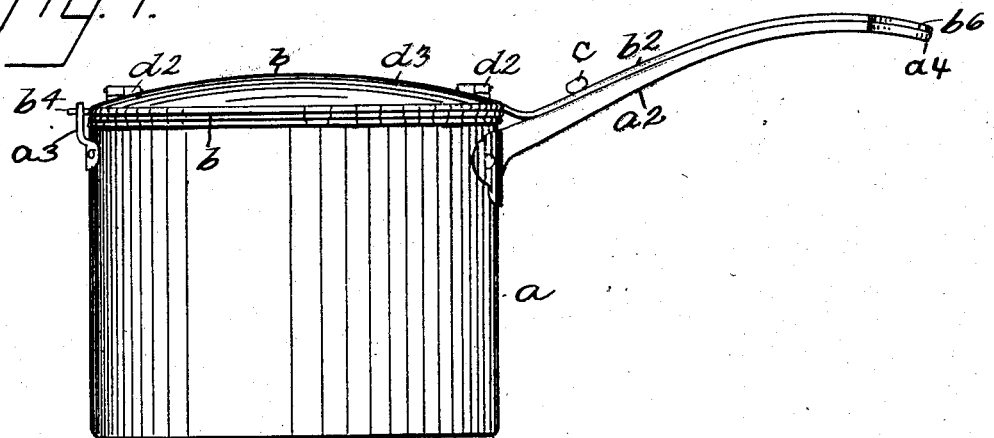
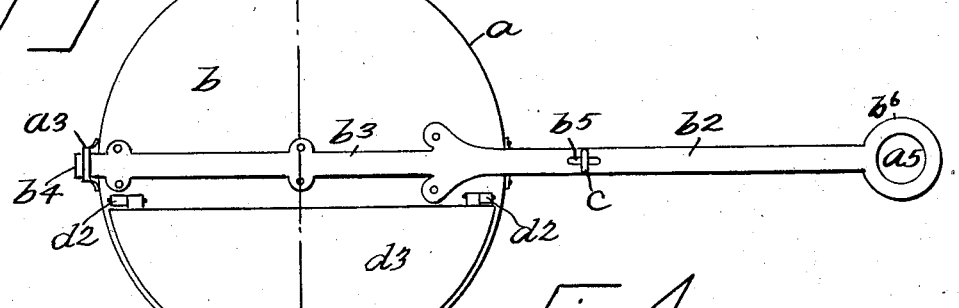
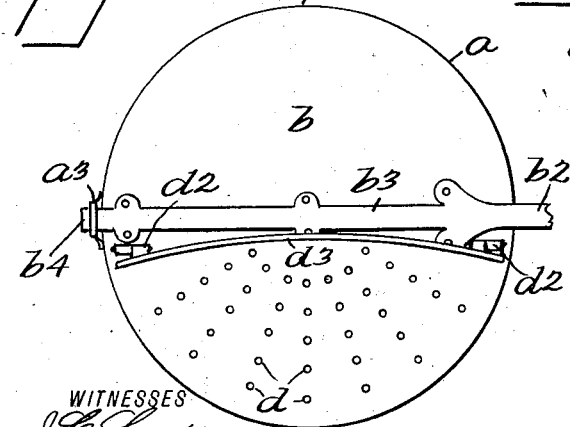
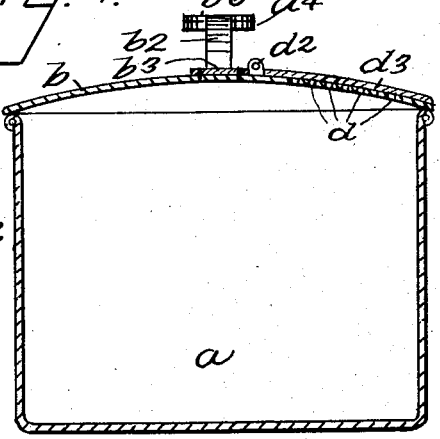
WITNESSES
J. C. Larsen
F. A. Stewart
INVENTOR
Sigmond Szentjanossy
BY Edgar Tate & Co
ATTORNEYS No. 737,171.

Patented August 25, 1903.

UNITED STATES PATENT OFFICE.

SIGMOND SZENTJÁNOSSY, OF NEW YORK, N. Y.

COOKING UTENSIL.

SPECIFICATION forming part of Letters Patent No. 737,171, dated August 25, 1903.

Application filed November 24, 1902. Serial No. 132,516. (No model.)

*To all whom it may concern:*

Be it known that I, SIGMOND SZENTJÁNOSSY, a citizen of Austria-Hungary, residing at New York, in the county of New York and State of New York, have invented certain new and useful Improvements in Cooking Utensils, of which the following is a specification, such as will enable those skilled in the art to which it appertains to make and use the same.

The object of this invention is to provide an improved cooking utensil designed for use as a stew-pot, stew-pan, boiler, and for similar purposes and in which food may be cooked without removing the cover, so that the aroma of the food will not needlessly be evaporated or passed off as vapor and from which the surplus of water or liquid may be poured without removing the cover; and with these and other objects in view the invention consists in a cooking utensil of the class specified constructed as hereinafter described and claimed.

In the drawings forming part of this specification, in which the separate parts of my improvement are designated by suitable reference characters in each of the views, Figure 1 is a side elevation of a cooking utensil made according to my invention; Fig. 2, a plan view thereof; Fig. 3, a view similar to Fig. 2, but showing one part of the cover raised; and Fig. 4 a transverse section on the line 4 4 of Fig. 2.

In the practice of my invention I provide a cooking utensil of the class specified comprising a vessel $a$, which may be of any desired shape, but which in the construction shown is cylindrical in form, and said vessel is open at the top and provided at one side with an outwardly-directed curved handle $a^2$, and directly opposite the handle $a^2$ is an upwardly-directed member $a^3$, which, as shown in the drawings, is secured to the vessel $a$, but which may be formed integrally therewith, if desired.

The vessel $a$ is provided with a cover $b$, having a handle $b^2$, which projects over and rests upon the handle $a^2$ of the vessel $a$ when the cover $b$ is in position. The handle $b^2$ of the cover $b$ is provided with an extension $b^3$, which passes transversely and centrally across said cover and is secured thereto as shown at $b^4$ or in any desired manner, and the extension $b^3$ of the handle $b^2$ of the cover $b$ is provided with a lug or projection $b^4$, which passes loosely through a corresponding opening in the member $a^3$. The handle $b^2$ of the cover $b$ is also preferably provided with a slot or opening $b^5$, through which passes a headed pin $c$, connected with the handle $a^2$ of the vessel $a$ and adapted to turn therein, or said pin may be stationary in the handle $a^2$ and be provided with a turnable head.

The outer end of the handle $a^2$ of the vessel $a$ is provided with an enlargement $a^4$, in which is an opening $a^5$, and the corresponding end of the handle $b^2$ of the cover $b$ is provided with a corresponding enlargement $b^6$, in which is formed an opening similar to that in the handle $a^2$, both of said openings being designated in Fig. 2 by the reference character $a^5$.

One side of the cover $b$ is provided with a plurality of perforations $d$, and hinged to said cover at $d^2$ is a shield $d^3$, which is designed to cover the openings $d$, and said shield $d^3$ in its normal position rests on the cover $b$ of the vessel $a$, so as to close or partially close the openings $d$.

In the position of the parts shown in Figs. 2 and 4 the vessel $a$ will be closed or practically closed; but when the shield is in the position shown in Fig. 3 the perforations or openings $d$ will be open, and the steam or vapor will be free to pass out from the vessel therethrough. The normal position of the shield $d^3$ is that shown in Figs. 2 and 3, and when the pressure in the vessel becomes too great the shield will be automatically raised and a sufficient amount of the vapor or steam will pass out, so as to relieve said pressure.

From the foregoing description it will be seen that the steam and vapor produced by the cooking of an article in the vessel $a$ will be to a considerable extent confined within said vessel, only enough thereof being allowed to pass out to prevent the pressure from becoming too great within said vessel, and when the shield is in the position shown in Fig. 3 the water or other liquid may be poured out without removing the cover $b$.

By forming the handles $a^2$ and $b^2$ as herein described and projecting the handle $b^2$ over the handle $a^2$ contiguous thereto the vessel with the cover in position may be manipulated in any desired manner without danger of the cover becoming detached, and this is true whether or not the pin $c$ be employed, and by forming the holes or openings in the outer ends of said handles the utensil may be conveniently hung up both by handle $a^2$ and the handle $b^2$ by passing a hook, nail, or other support through said openings.

My improved cooking utensil is simple in construction and operation and comparatively inexpensive and is perfectly adapted to accomplish the result for which it is intended, and changes in and modifications of the construction described may be made without departing from the spirit of my invention or sacrificing its advantages.

Having fully described my invention, what I claim as new, and desire to secure by Letters Patent, is—

A cooking utensil comprising a vessel having a handle projecting from one side thereof at the top thereof and an upwardly-directed member at the opposite side, and a cover provided with openings in a part thereof, a shield hinged to the said cover and adapted to close said openings, said cover being also provided with a handle which projects in the same direction and over the handle of the vessel and which is secured to the top of said cover and extends transversely across the same and is provided opposite the handle with a projection which passes through the member secured to the vessel, the handle of the cover being also provided adjacent to the vessel with a longitudinal slot and the handle of the vessel with a headed pin turnably mounted therein and adapted to pass through said slot, substantially as shown and described.

In testimony that I claim the foregoing as my invention I have signed my name, in presence of the subscribing witnesses, this 21st day of November, 1902.

SIGMOND SZENTJÁNOSSY.

Witnesses:
T. A. STEWART,
C. E. MULREANY.